United States Patent
Paskind et al.

(10) Patent No.: US 11,549,374 B2
(45) Date of Patent: Jan. 10, 2023

(54) GAS TURBINE ROTOR COMPONENT AND METHOD OF MANUFACTURE

(71) Applicant: United Technologies Corporation, Farmington, CT (US)

(72) Inventors: Jeremy K. Paskind, Glastonbury, CT (US); Carl Busta, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 219 days.

(21) Appl. No.: 16/793,950

(22) Filed: Feb. 18, 2020

(65) Prior Publication Data
US 2021/0254468 A1    Aug. 19, 2021

(51) Int. Cl.
*B23P 15/00*     (2006.01)
*F01D 5/08*      (2006.01)
*C22C 19/03*     (2006.01)

(52) U.S. Cl.
CPC ............. *F01D 5/08* (2013.01); *B23P 15/006* (2013.01); *C22C 19/03* (2013.01)

(58) Field of Classification Search
CPC ..... F01D 5/08; F01D 5/28; F01D 5/34; F01D 5/02; B23P 15/006; C22C 19/03; C22C 1/0433; B22F 5/009; F05D 2230/239; F05D 2230/25; F05D 2300/10; F05D 2300/175
See application file for complete search history.

(56) References Cited

U.S. PATENT DOCUMENTS

| | | | | |
|---|---|---|---|---|
| 2,519,406 A | * | 8/1950 | Scott | C22C 38/44 420/586.1 |
| 4,096,615 A | * | 6/1978 | Cross | F01D 5/3061 228/186 |
| 4,270,256 A | * | 6/1981 | Ewing | B22F 5/04 29/423 |
| 4,329,175 A | * | 5/1982 | Turner | B22F 7/06 416/223 R |
| 5,100,050 A | | 3/1992 | Krueger et al. | |
| 5,106,012 A | | 4/1992 | Hyzak et al. | |

(Continued)

FOREIGN PATENT DOCUMENTS

| | | |
|---|---|---|
| EP | 1526252 A2 | 4/2005 |
| EP | 2520395 A2 | 11/2012 |
| WO | 2015012888 A1 | 1/2015 |

OTHER PUBLICATIONS

Nickel Institute, "IN-100 Alloy Engineering Properties", 2021, pp. 1-17; https://nickelinstitute.org/media/8d91ba672f5b858/ni_inco_483_in_100alloyengineeringproperties.pdf Accessed May 12, 2022 (Year: 2021).*

(Continued)

*Primary Examiner* — Ryan J. Walters
(74) *Attorney, Agent, or Firm* — Cantor Colburn LLP

(57) ABSTRACT

A turbine rotor disk and a method of making the turbine rotor disk using solid state bonding techniques are disclosed. The turbine rotor disk includes a radially inner portion comprising a wrought nickel alloy having a yield strength of at least 126 ksi at 1,000° F. The turbine rotor disk also includes a radially outer portion bonded to the radially inner portion, said radially outer portion comprising a cast nickel alloy configured as a single crystal or with a grain size of ASTM 2 or larger.

7 Claims, 4 Drawing Sheets

(56) References Cited

U.S. PATENT DOCUMENTS

| | | | |
|---|---|---|---|
| 5,113,583 A * | 5/1992 | Jenkel | F01D 5/3061 |
| | | | 29/889 |
| 5,161,950 A | 11/1992 | Krueger et al. | |
| 5,529,643 A | 6/1996 | Yoon et al. | |
| 7,137,787 B2 | 11/2006 | James | |
| 7,950,146 B2 | 5/2011 | Arrell et al. | |
| 8,616,851 B2 | 12/2013 | Didomizio et al. | |
| 8,918,996 B2 | 12/2014 | Wessman et al. | |
| 2015/0192022 A1 * | 7/2015 | Reed | C22C 19/056 |
| | | | 420/586 |
| 2016/0076381 A1 | 3/2016 | Suciu et al. | |
| 2017/0022827 A1 | 1/2017 | Waldman et al. | |
| 2018/0104765 A1 * | 4/2018 | Bochiechio | B23K 20/16 |
| 2018/0105914 A1 * | 4/2018 | Bochiechio | B23P 15/006 |

OTHER PUBLICATIONS

European Search Report for European Application No. 21157594.9; Application Filing Date: Feb. 17, 2021; dated Jul. 30, 2021; 4 pages.

* cited by examiner

GAS TURBINE ROTOR COMPONENT AND METHOD OF MANUFACTURE

BACKGROUND

Exemplary embodiments pertain to the art of ceramic matrix composites.

In gas turbine engines, disks which support turbine blades rotate at high speeds in a high temperature environment. In modern engines, operating temperatures can exceed 1500° F. (816° C.) in the exterior or rim portion of disks, and about 1000° F. (538° C.) at the inner or hub portions. In addition to this radial temperature gradient, there is also a stress gradient, with higher stresses occurring in the lower temperature hub region, while lower stresses occur in the higher temperature rim region in a typical disk. These differences in operating conditions radially across a disk result in different mechanical property requirements in the different disk regions, with the rim portion subjected to severe creep and hold time fatigue crack growth conditions, and the hub portion subjected to severe fatigue and high stress conditions. In order to achieve the maximum operating conditions in terms of efficiency and performance in an advanced turbine engine, it is desirable to utilize disk alloys having excellent hold time fatigue crack growth resistance and high temperature creep resistance in the rim portion while having high tensile strength and fatigue crack resistance at moderate temperatures in the hub portion.

BRIEF DESCRIPTION

A turbine rotor disk is disclosed. The turbine rotor disk includes a radially inner portion comprising a wrought nickel alloy having a yield strength of at least 126 ksi at 1,000° F. The turbine rotor disk also includes a radially outer portion bonded to the radially inner portion, said radially outer portion comprising a cast nickel alloy configured as a single crystal or with a grain size of ASTM 2 or larger.

In addition to one or more of the features described above, or as an alternative to any of the foregoing embodiments, the second preform can include the cast nickel alloy configured as a single crystal.

In addition to one or more of the features described above, or as an alternative to any of the foregoing embodiments, the second preform can include the cast nickel alloy configured with a grain size of ASTM 2 or larger.

In addition to one or more of the features described above, or as an alternative to any of the foregoing embodiments, the second preform can have a grain size of ASTM 1 or larger.

In addition to one or more of the features described above, or as an alternative to any of the foregoing embodiments, the second preform can have a grain size of ASTM 0 or larger.

In addition to one or more of the features described above, or as an alternative to any of the foregoing embodiments, the first portion can include a bore of the turbine rotor disk, and the second portion can include a rim of the turbine rotor disk.

Also disclosed is a gas turbine engine comprising a compressor, a combustor, and a turbine disposed along an air flow path including the turbine rotor disk of one or more of the features described above.

A method of making a gas turbine rotor component is also disclosed. According to the method, a first preform is provided corresponding to a radially inner portion of the turbine rotor disk. The first preform comprises a wrought nickel alloy having a yield strength of at least 126 ksi at 1,000° F. A second preform is provided corresponding to a radially outer portion of the turbine rotor disk. The second preform comprising a cast nickel alloy configured as a single crystal or with a grain size of ASTM 2 or larger. The first and second preforms are solid-state bonded together under heat and pressure to form a turbine rotor disk including a radially inner portion comprising the first preform and a radially outer portion comprising the second preform.

In addition to one or more of the features described above, or as an alternative to any of the foregoing embodiments, bonding the first and second preforms together can include inertia bonding the first and second preforms together.

In addition to one or more of the features described above, or as an alternative to any of the foregoing embodiments, bonding the first and second preforms together can include diffusion bonding the first and second preforms together.

In addition to one or more of the features described above, or as an alternative to any of the foregoing embodiments, the second preform can include the cast nickel alloy configured as a single crystal.

In addition to one or more of the features described above, or as an alternative to any of the foregoing embodiments, the second preform can include the cast nickel alloy configured with a grain size of ASTM 2 or larger.

In addition to one or more of the features described above, or as an alternative to any of the foregoing embodiments, providing the first preform can include working a billet comprising the nickel alloy to form the first preform.

In addition to one or more of the features described above, or as an alternative to any of the foregoing embodiments, providing the second preform can include casting the nickel alloy under conditions to form the nickel alloy of the second preform configured as a single crystal.

In addition to one or more of the features described above, or as an alternative to any of the foregoing embodiments, providing the second preform can include casting the nickel alloy under conditions to form the nickel alloy of the second preform configured with a grain size of ASTM 2 or larger.

In addition to one or more of the features described above, or as an alternative to any of the foregoing embodiments, the second preform can have a grain size of ASTM 1 or larger.

In addition to one or more of the features described above, or as an alternative to any of the foregoing embodiments, the second preform can have a grain size of ASTM 0 or larger.

In addition to one or more of the features described above, or as an alternative to any of the foregoing embodiments, providing the first preform can include working a billet comprising the nickel alloy to form the first preform, and providing the second preform can include casting the nickel alloy under conditions to form the nickel alloy of the second preform as a single crystal or with a grain size of ASTM 2 or larger.

In addition to one or more of the features described above, or as an alternative to any of the foregoing embodiments, the first preform can include a portion corresponding to a bore of the turbine rotor disk, and the second preform can include a portion corresponding to a rim of the turbine rotor disk.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Although shown and described above and below with respect to an aircraft, embodiments of the present disclosure are applicable to turbines used for any type of vehicle or for on-site installation in fixed systems. For example, military vehicles, heavy machinery vehicles, sea craft, ships, submarines, etc., as well as numerous stationary power systems such as electricity generation or other applications where power is generated or used. As such, the present disclosure is not limited to application to aircraft, but rather aircraft are illustrated and described as example and explanatory embodiments for implementation of embodiments of the present disclosure.

Figure 1:
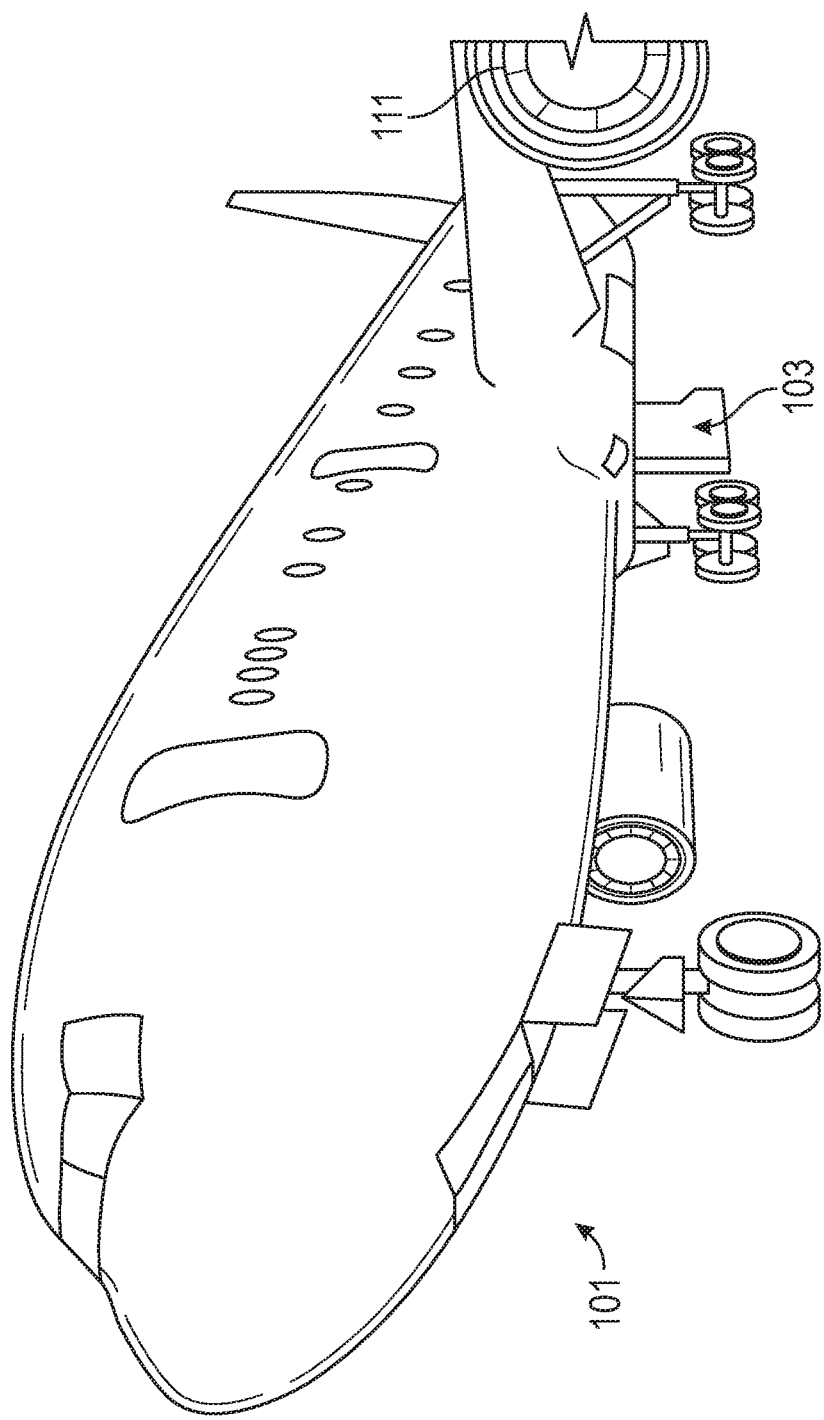
FIG. 1 is a schematic illustration of an aircraft that can incorporate various embodiments of the present disclosure.

With respect now to FIG. 1, an aircraft includes an aircraft body 101, which can include one or more bays 103 beneath a center wing box. The bay 103 can contain and/or support one or more components of the aircraft 101. Also shown in FIG. 1, the aircraft includes one or more engines 111. The engines 111 are typically mounted on the wings 112 of the aircraft and are connected to fuel tanks (not shown) in the wings, but may be located at other locations depending on the specific aircraft configuration.

Figure 2:
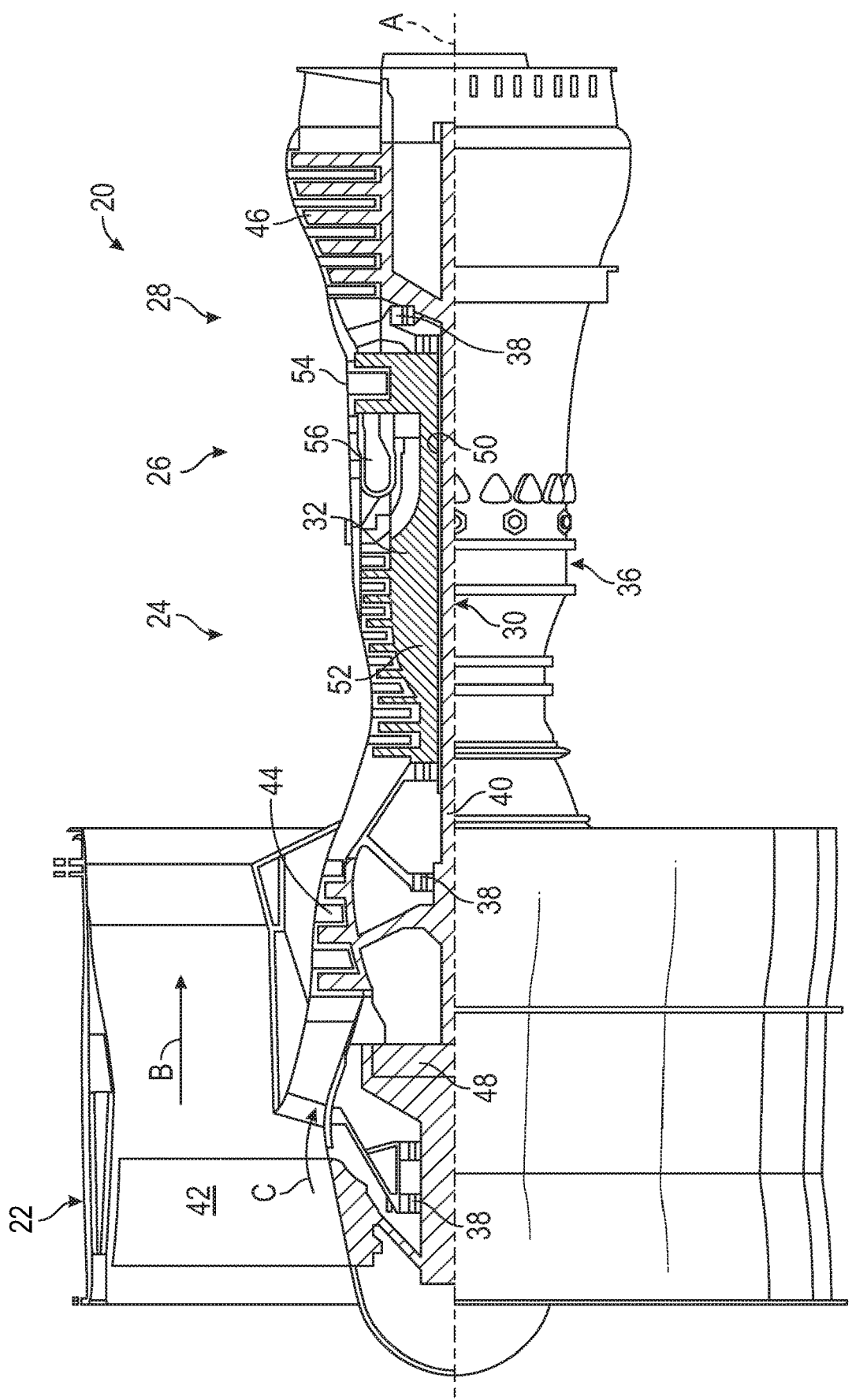
FIG. 2 is a partial cross-sectional view of a gas turbine engine.

FIG. 2 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis. A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption (TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 3:
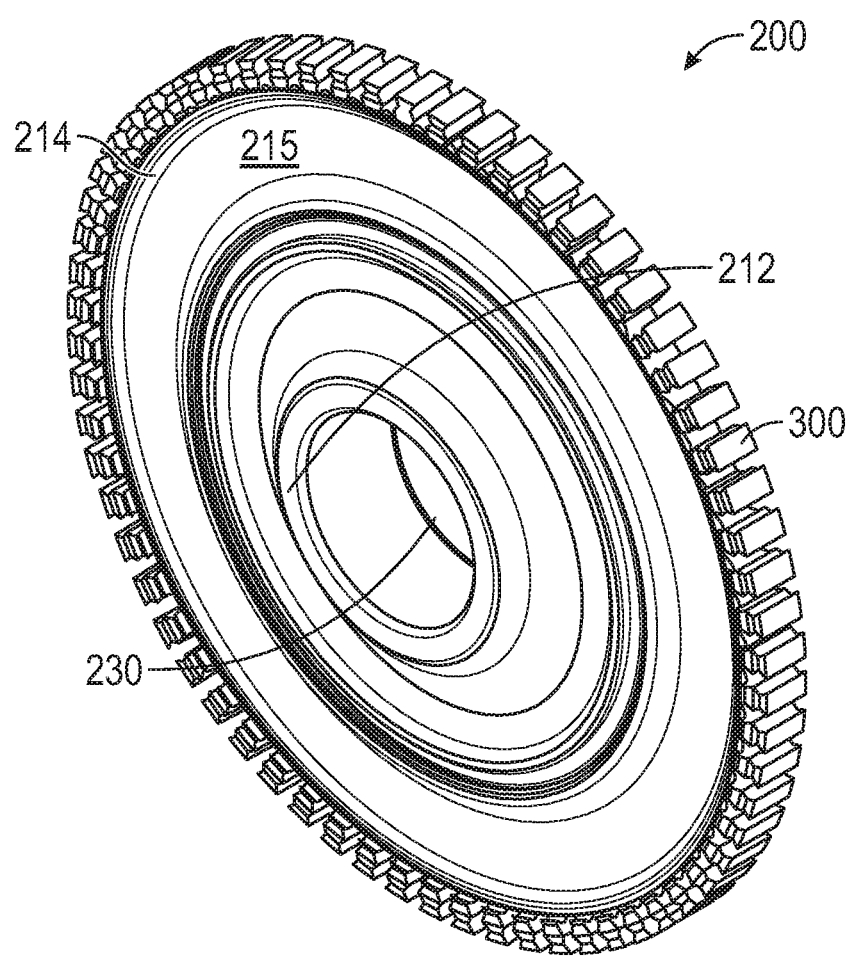
FIG. 3 schematically shows a turbine disk.

Turbines in the turbine section 28 such as the low pressure turbine 46 or the high pressure turbine 54 typically include radially-extending turbine blades attached to a radially central disk. An example embodiment of a turbine rotor 200 is schematically shown in FIG. 3. As shown in FIG. 3, the turbine rotor 200 includes a disk 210 made up of a radially inner portion 212 extending radially outward from an inner circumference that defines a bore 230. The radially inner portion 212 is also commonly referred to as a bore or bore portion. The disk 210 also includes a radially outer portion 214 extending inwardly from a rim at the radially outer periphery of the disk 210. The radially outer portion 214 is also commonly referred to as a rim or rim portion. The portion of the disk 210 between the bore portion and the rim portion is commonly referred to as a web 215. The turbine rotor 200 also includes a plurality of attachments 300 for blades attached to the radially outer portion 214 at the rim of the disk 210. The blades can be attached to the disk rim with various type of attachments, including but not limited to mechanical attachment or welded attachment.

Figure 4A:
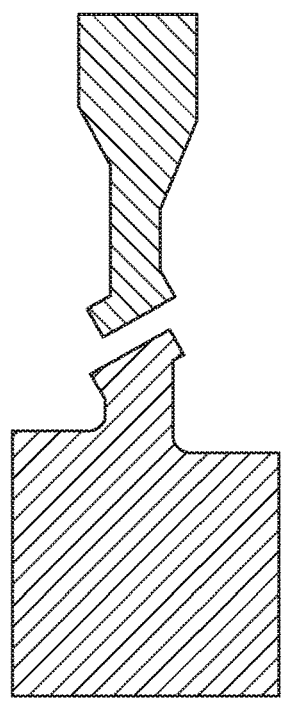
FIGS. 4A and 4B schematically show a cross-sectional view components of a dual alloy disk, and of an assembled dual alloy disk.
Figure 4B:
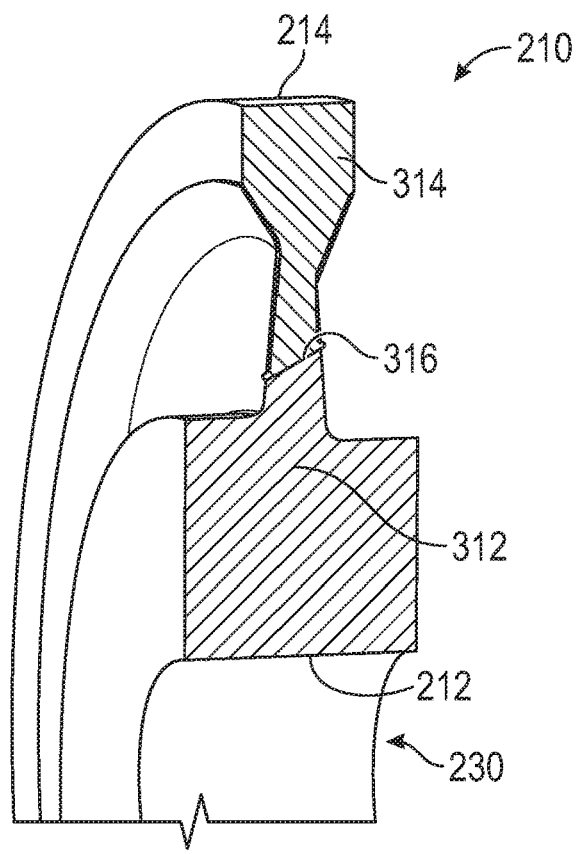

As mentioned above, a turbine rotor disk is formed by joining preforms of different metals. An example embodiment of a disk 210 is schematically shown in FIGS. 4 and 4B with a cross-section cut-away to illustrate the joining of a radially inner preform 312 and a radially outer preform 314 along a joint 316. As shown in FIG. 4A (which carries forward numbering from FIG. 3), the inner and outer preforms 312/314 are arranged to be brought together along as shown in FIG. 4B. The joint 316 is disposed at an angle to (i.e., not parallel with) the rotational axis of the disk 210 (and of course is also at an angle to the radius of the disk 210). An angled joint can facilitate contact between the radially inner and outer preforms 312/314 during bonding, although it is not required and in some aspects the joint 316 can be parallel with the rotational axis of the disk 210.

As further mentioned above, the radially inner preform 312 can be formed from a wrought nickel alloy having a yield strength (defined in ASTM E8-13) of at least 125 ksi at 1,000° F. In some aspects, the radially outer preform 314 can have a yield strength of 135 ksi at 1,000° F. In some aspects, the radially outer preform 314 can have a yield strength of 150 ksi at 1,000° F. Examples of alloys for the radially inner preform 312 include but are not limited to Inconel 718, Waspaloy, or powder based alloys such as IN-100. The radially inner preform 312 can be formed by any metal forming process, including wrought processing of billets (which in turn can be formed by known techniques such as casting, extrusion, or hot rolling) or nickel starting preforms formed by powder metallurgy. The alloy out of which the radially inner preform 312 is formed can be configured to have properties such as high strength, with fatigue resistance and high fracture toughness.

As further mentioned above, the radially outer preform 314 can be formed from a cast nickel alloy configured as a single crystal or an equiaxed alloy with a grain size of ASTM 2 (defined in ASTM E112-12) or larger. Examples of alloys for the radially outer preform 314 include but are not limited to Mar-M-200, Mar-M-247, Rene 80, Rene 125, or CMSX-4. In some aspects, the alloy out of which the radially outer preform 314 is formed can have a grain size of ASTM 1 or larger, or of ASTM 0 or larger. The radially outer preform 314 can be formed by any casting under conditions to produce the target grain size or single-crystal structure. A single-crystal grain structure can be provided by gradual directional solidification in a ceramic mold in which a helical channel with smooth continuous turning a short distance above a knurled chill plate surface (i.e., "starter chamber") provides a filtering effect to reduce the number of crystals exiting the channel A seed crystal can be used to further promote formation of a single crystal grain structure. Coarse grain sizes of ASTM 2 or greater in cast metals can be promoted by higher mold temperatures, greater melt temperature, and slower cooling rates. The alloy out of which the radially outer preform 314 is formed can be configured to have properties such as creep resistance, thermo-mechanical fatigue resistance.

The first and second preforms 312/314 can be fused together by solid state bonding, also known as thermocompression bonding. Examples of solid state bonding techniques include inertia bonding and diffusion bonding. In some aspects, forge bonding can be uses; however, in some other aspects, forge bonding is avoided in order to avoid trapping of flash inside the forge, and to avoid potential reduction of grain size in the second preform 314.

Inertia bonding is a solid-state bonding technique performed by rotating one or both of the preforms 312 and 314 with respect to each other about the disk axis. In some aspects, the outer preform 314 can be held stationary while the inner preform 312 is rotated. This approach can facilitate engagement of the stationary outer preform 314 with a press or other source of compressive force for application of pressure between the preforms 312 and 314 while allowing for relative rotation of the preform provided by the rotating inner preform 312. Relative rotation of the preforms 312/314 generates heat from friction between the contacted surfaces of the preforms 312 and 314, and the combination of heat and pressure creates conditions for thermocompression bonding. In inertia bonding-one part is stationary and the other is moving, for linear inertia bonding (linear friction welding) external motion is applied between the two parts while pressure is also applied to cause heating, flow, and joining very rapidly. For rotational friction bonding one part is typically brought up to rotating speed, the external for of rotation removed, and the parts brought into contact under pressure to promote heating, flow, and joining.

Diffusion bonding is a solid-state bonding technique performed by contacting the preforms 312 and 314 and applying heat and pressure. Compressive force can be applied with a press or die other source of compressive force to the outer rim surface of the preform 314 and/or to the inner circumference of the preform 312. Heat can be applied externally, such as by placing the preforms 312/314 in a furnace or oven during bonding or internally such as by induction. The preforms 312/314 can be maintained at these conditions for a period of time sufficient to produce a bond (e.g., 1-12 hours).

Once bonded, the preforms 312 and 314 are joined together along the joint 316. The joint 316 can be a solid state weld joint that contains elements from the metal alloys of each of the preforms, and can exhibit hybrid or blended properties of the blended alloys. The combination of different alloys provides a technical benefit of a robust rotor disk structure having customized properties for the hot conditions encountered by the outer portion 214 of the disk 210 and the high-stress conditions encountered by the inner portion 212 of the disk 210. For example, traditional rotor alloys are limited to temperatures far below the gas path temperatures of turbine engines. Substantial cooling is required to keep the rotors at an acceptable temperature, this cooling air contributes to loss of efficiency (thrust-specific fuel consumption, also known as TSFC) in the engine. Engine efficient could be improved by increasing allowable rotor rim temperatures.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of making a turbine rotor disk, comprising:
   providing a first preform corresponding to a radially inner portion of the turbine rotor disk, said first preform comprising a wrought nickel alloy having a yield strength of at least 126 ksi at 1,000° F.;
   providing a second preform corresponding to a radially outer portion of the turbine rotor disk, said second preform comprising a cast nickel alloy configured with a grain size of ASTM 2 or larger; and
   solid-state bonding the first and second preforms together under heat and pressure to form a turbine rotor disk including a radially inner portion comprising the first preform and a radially outer portion comprising the second preform;
   wherein bonding the first and second preforms together comprises inertia bonding the first and second preforms together.

2. The method of claim 1, wherein providing the first preform comprises working a billet comprising the nickel alloy to form the first preform.

3. The method of claim 1, wherein providing the second preform comprises casting the nickel alloy under conditions to form the nickel alloy of the second preform configured with a grain size of ASTM 2 or larger.

4. The method of claim 3, wherein the second preform has a grain size of ASTM 1 or larger.

5. The method of claim 3, wherein the second preform has a grain size of ASTM 0 or larger.

6. The method of claim 1, wherein providing the first preform comprises working a billet comprising the nickel alloy to form the first preform, and wherein providing the second preform comprises casting the nickel alloy under conditions to form the nickel alloy of the second preform with a grain size of ASTM 2 or larger.

7. The method of claim 1, wherein the first preform includes a portion corresponding to a bore of the turbine rotor disk, and the second preform includes a portion corresponding to a rim of the turbine rotor disk.

* * * * *